United States Patent [19]

Hoffman

[11] Patent Number: 4,587,862
[45] Date of Patent: May 13, 1986

[54] TRANSMISSION FOR PUMPS

[75] Inventor: Kenneth F. Hoffman, Collegeville, Pa.

[73] Assignee: Hale Fire Pump Company, Conshohocken, Pa.

[21] Appl. No.: 513,378

[22] Filed: Jul. 10, 1983

[51] Int. Cl.⁴ ............................................. F16H 37/00
[52] U.S. Cl. ..................................... 74/15.88; 74/340
[58] Field of Search ..................... 74/11, 15.88, 15.8, 74/15.82, 15.84, 340, 342, 344, 606 R, 665

[56] References Cited

U.S. PATENT DOCUMENTS

| | | | |
|---|---|---|---|
| 1,612,846 | 1/1927 | Williams | 74/15.88 |
| 1,755,395 | 4/1930 | Hicks | 74/15.88 |
| 1,862,400 | 6/1932 | Herman | 74/15.88 |
| 1,900,415 | 3/1933 | Fullerton | 74/15.88 |
| 2,482,110 | 9/1949 | Hill | 74/15.88 |
| 2,494,988 | 1/1950 | Collura | 74/15.88 |
| 3,149,505 | 9/1964 | Byrkhalter | 74/15.88 |

Primary Examiner—Ronald B. Cox
Attorney, Agent, or Firm—Frank A. Follmer

[57] ABSTRACT

A transmission for a pump is constructed of an input member rotatably mounted in a housing and including a splined shaft portion and an input flange portion, an output member rotatably mounted in the housing in axial alignment with the input member and including a splined shaft portion and an output flange portion, and a sliding gear slidably mounted on the splined shaft portion of the input member at an internal splined portion thereof and having externally facing gear teeth. The sliding gear is movable between a "ROAD" position wherein its internal splined portion engages both the splined shaft portions of the input member and the output member and a "PUMP" position wherein its internal splined portion only engages the splined shaft portion of the input member and the gear teeth thereof are in engagement with gear means for driving the pump shaft.

12 Claims, 5 Drawing Figures

TRANSMISSION FOR PUMPS

BACKGROUND AND SUMMARY OF THE INVENTION

In pumps of the type mounted on fire trucks for fire fighting service there is a need for a transmission for the pump capable of operating with the high torques put out by the transmissions of the newer fire trucks.

One type of pump transmission in use today comprises an input flange keyed onto an input shaft, an output flange keyed onto an output shaft, and a sliding gear which slides between a "ROAD" position and a "PUMP" position. The input flange is connected to the transmission on the fire truck to be driven thereby and to cause rotation of the input shaft keyed thereto. The output flange is connected to the rear wheels of the fire truck for driving the same. The sliding gear is slidable axially on a splined portion on the input shaft. In the "ROAD" position of the sliding gear, its gear teeth are engaged with internally facing gear teeth formed in a collar that is part of the output shaft. In this manner, torque is transmitted from the input shaft to the output shaft which has its output flange connected to the rear wheels of the fire truck for driving same. In the "PUMP" position of the sliding gear, its teeth are engaged with the driving gear of the pump which is mounted adjacent to the pump transmission.

While the above-described conventional pump transmission is satisfactory for the torque loads of transmissions of the older fire trucks, it would be impractical to construct such a unit to withstand the much higher torques of the newer transmissions.

It is the general object of the invention to provide a compact pump transmission of the indicated type which is very strong so that it can operate with very high torque truck transmissions and, at the same time, is less expensive to manufacture than a comparable prior pump transmission design.

Briefly stated, the greater strength of the pump transmission in accordance with the invention is achieved by constructing the transmission of an input member having a splined shaft portion and an input flange portion, an output member having a splined shaft portion and an output flange portion, the splined portions of the input and output shaft being axially aligned and of the same configuration, and a sliding gear having an internal splined portion adapted to slide along the splined portions of the input and output shaft portions. The unit is constructed so that in the "ROAD" position, the sliding gear is engaged with both the splined portions of the input and output members. In the "PUMP" position the sliding gear is engaged with the splined portion of the input member only and has its gear teeth engaged with a driving gear of the pump.

The design in accordance with the invention involving the two splines on the input and output shaft portions is double the strength of the arrangement of the prior art using a collar with internally facing gear teeth. Moreover, the design in accordance with the invention is cheaper than the prior design in that its manufacture involves less machining and simpler manufacturing techniques.

The added strength also results from the elimination of the need for a key in a keyway as is used in the prior design involving a separate flange keyed onto a shaft at both the input and output of the pump transmission. The integral flange and shaft design of the pump transmission of the invention makes it possible to manufacture the input and output members out of a one-piece high strength steel forging which is much stronger than the two-part flange and shaft design of the prior pump transmission.

Thus, the design in accordance with the invention is compact, much stronger and involves less machining, and even considering the increased torque carrying ability, the overall size and weight is less. Because of these reductions the ultimate manufacturing cost is much less.

Another advantage of the design in accordance with the invention is that the width between the input flange and the output flange can be reduced by one third as compared with a comparable prior design. The design in accordance with the invention involving integrating the flange and shaft together makes it possible to bring the input and output flanges closer together than in the prior arrangement. This is very critical in applications such as use on a large truck, such as a fire truck, since the shorter this distance the more compact it is possible to make the fire truck i.e., the closer the rear wheels can be to the front wheels.

Another feature of the design in accordance with the invention is that it provides a convenient place for providing a thread for use in actuating a speed counter. The thread is incorporated directly on the shaft portion of the input member which is a convenient and inexpensive location.

Another feature in accordance with the invention is that the input and output flange portions are provided with dual piloting diameters and multiple hole arrangements such that the flange portions can be engaged with a plurality of different standard sizes of truck transmission and rear wheel drive line flanges. Thus, the pump transmission is adapted to be used with a wide variety of trucks and a wide variety of engines that operate at different torques.

DETAILED DESCRIPTION OF THE PREFERRED EMBODIMENT

Figure 1:
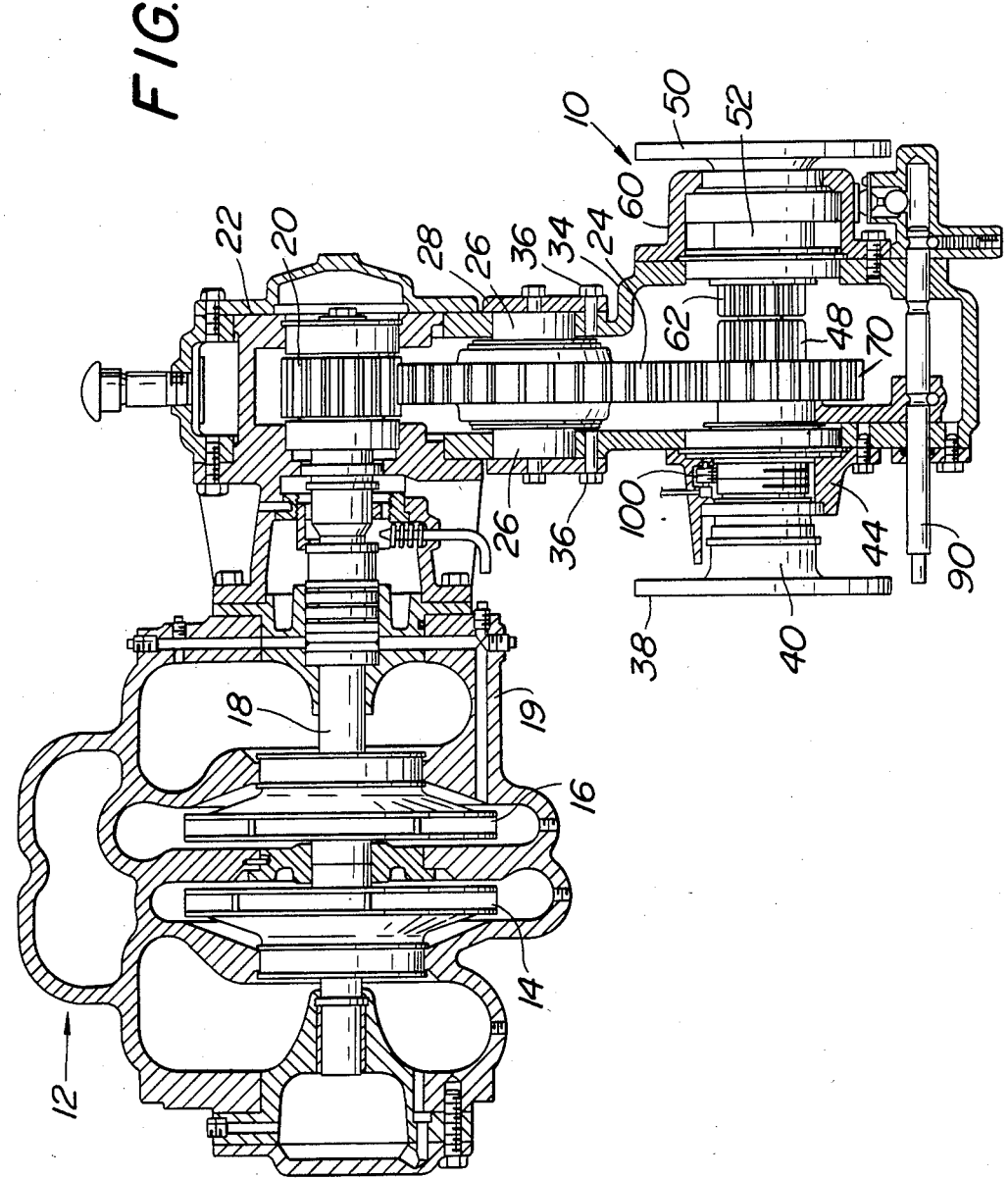
FIG. 1 is a sectional view showing a pump arranged to be driven by the pump transmission in accordance with the invention.

In FIG. 1 there is shown a pump transmission 10 in accordance with the invention for driving a typical midship pump 12 of the type used on fire trucks.

Pump 12 is a conventional two-stage centrifugal pump having impellers 14 and 16 mounted on a rotating pump shaft 18 driven by a pump shaft gear 20 which is mounted in a housing 22 externally of the pump housing 19. Pump shaft gear 20 is driven by a pump input gear 24 (also known as an intermediate gear) rotatably mounted adjacent housing 22 in bearings 26 contained in a housing 28. The above-described parts are the same as those conventionally used in fire pumps of the type driven by the prior art drive unit described previously.

Pump transmission 10 is shown in detail in FIG. 1 and comprises an input member 30 and an output member 32 rotatably mounted in axial end-to-end alignment in a housing 34, which is mounted below housing 28 by means of mounting bolts 36 (see FIG. 1).

Input member 30 has a one-piece integral construction, such as a forging, and comprises an input flange portion 38 and a shaft portion 40. Shaft portion 40 is rotatably mounted in housing 34 by means of roller bearing means 42 contained in an opening 43 in housing 34 and enclosed by a cover 44. The portion of shaft portion 40 extending from bearing 42 into the interior of housing 34 is cylindrical and has an externally formed involute splined portion 48.

Figure 2:
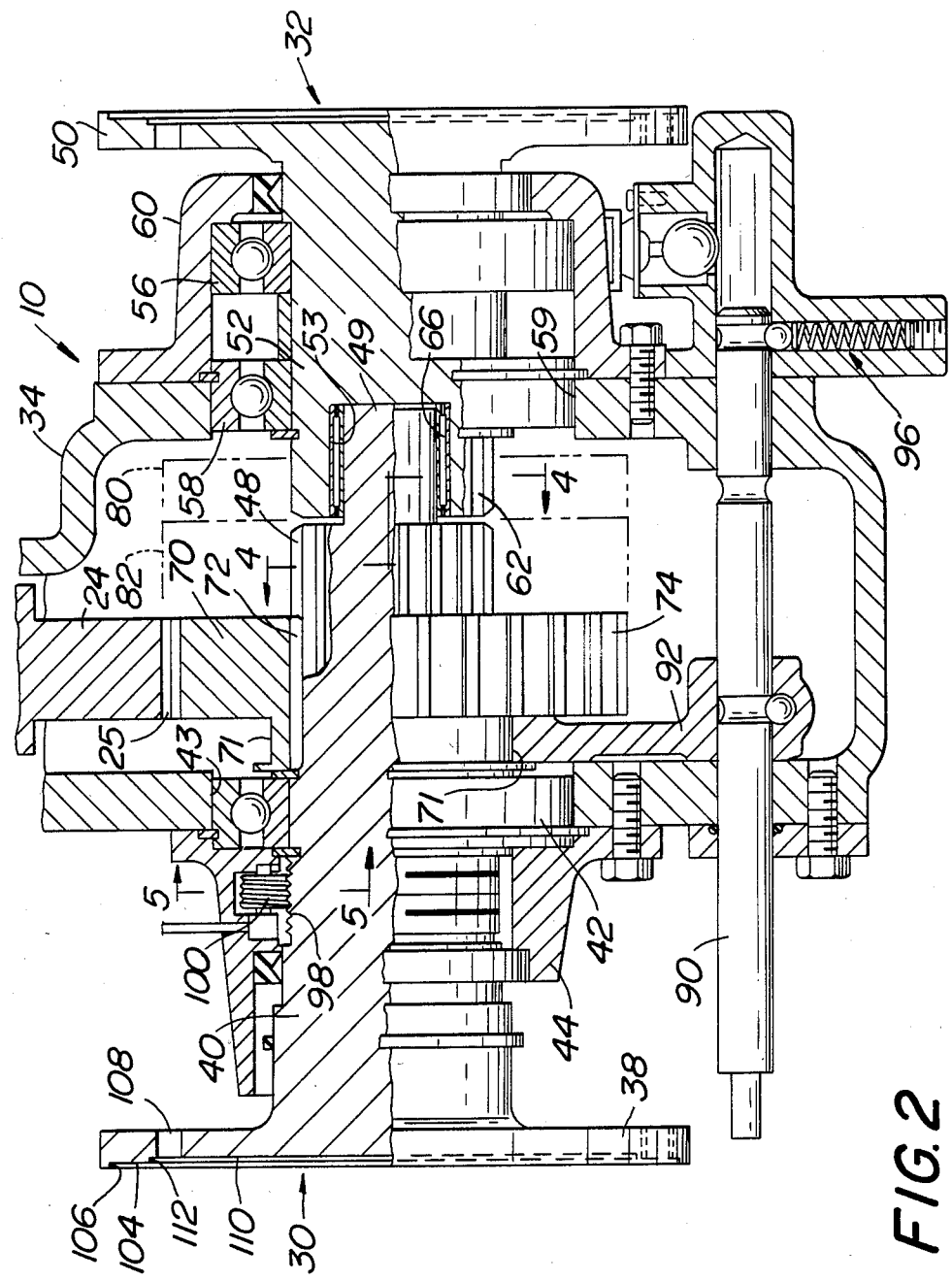
FIG. 2 is a sectional view showing the pump transmission in accordance with the invention.

Output member 32 is made of a one-piece integral construction, such as a forging, and comprises an output flange portion 50 and a shaft portion 52. Shaft portion 52 is rotatably mounted in housing 34 by means of a pair of roller bearings 56 and 58 contained, respectively, within an opening 59 in housing 34 and a cover 60 as shown in FIG. 2. The portion of shaft portion 52 extending inwardly from bearing 58 into the interior or housing 34 and to a location adjacent splined portion 48 is cylindrical and has an externally formed involute splined portion 62 of the same tooth configuration as the splined portion 48 as is best shown in FIG. 4.

Figure 4:
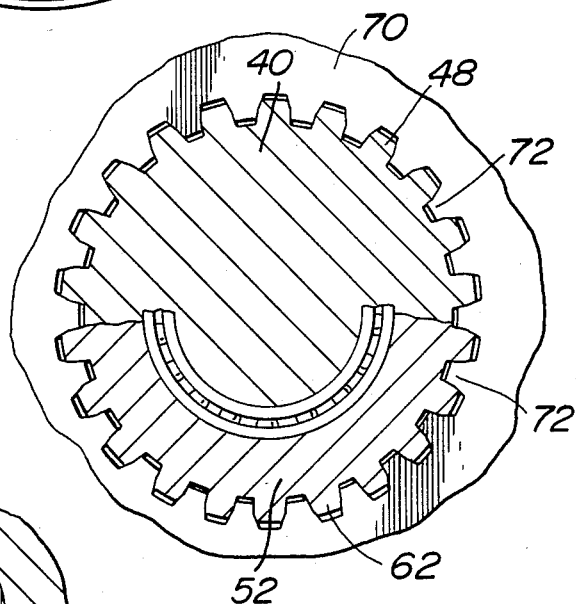
FIG. 4 is a sectional view taken on line 4—4 of FIG. 2.
Figure 5:
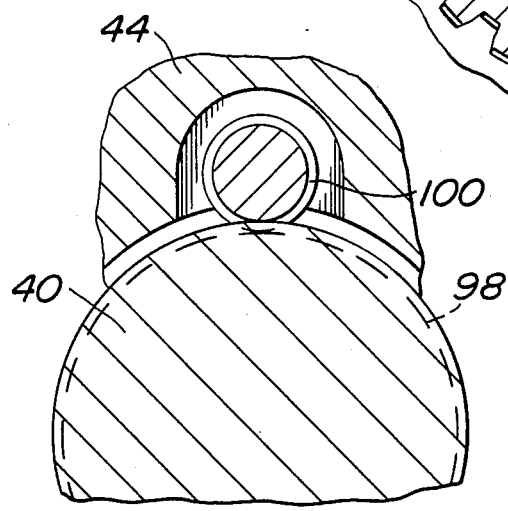
FIG. 5 is a sectional view taken on line 5—5 of FIG. 2.

The bearing supports for the shaft portions 40 and 52 of input member 30 and output member 32 are constructed and arranged so that the splined portions 48 and 62 are in axial alignment as can be seen from a comparison of FIG. 2 and FIG. 4.

At its inner end, input member 30 is provided with a reduced diameter portion 49 which extends within a bore 53 in the end of output member 32 to provide cooperating overlapping end portions. Bearing means, in the form of needle bearings 66, are located between the cooperating end portions 49 and 53 to provide for bearing engagement between input member 30 and output member 32 at this location.

A sliding gear 70 is mounted on splined portion 48 of input member 30 and comprises an internal involute splined portion 72 so that sliding gear 70 is slidable axially on splined portion 48. Sliding gear 70 is provided with external gear teeth 74 adapted to drivingly engage the gear teeth 25 of pump input gear 24 as is shown in FIG. 2. Sliding gear 70 is constructed and arranged to cooperate with the splined portions 48 and 62 of input member 30 and output member 32, respectively, to slide between a "ROAD" position wherein the internal splined portion 72 is in engagement with both splined portions 48 and 62 and a "PUMP" position wherein the internal splined portion 72 only engages the splined portion 48 of input member 30. In the "PUMP" position, shown in solid lines in FIG. 2, gear teeth 74 of sliding gear 70 engage gear teeth 25 of the pump input gear 24 for causing rotation thereof for driving the pump shaft 18 through gear 20 to cause rotation of pump impellers 14 and 16. The "ROAD" position of sliding gear 70 is shown by the dashed line 80 in FIG. 2. It is apparent that in the "ROAD" position, the internal splined portion 72 of gear 70 engages both splined portions 48 and 62 of input member 30 and output member 32, respectively.

The "NEUTRAL" position of sliding gear 70 is shown by the dashed line 82 in FIG. 2. It is apparent that in this position of sliding gear 70, the gear teeth 74 are not in driving engagement with the gear teeth 25 of gear 24 and the internal splined portion 72 of sliding gear 70 is engaged with splined portion 48 of input member 30 only.

Means are provided for actuating sliding gear 70 between the "PUMP", "NEUTRAL", and "ROAD" positions thereof as described above. This actuating means comprises a gearshift shaft 90 mounted in openings in housing 34 for sliding movement horizontally beneath sliding gear 70. An actuator arm 92 is carried on shaft 90 and extends upwardly therefrom to engage sliding gear 70 in a recessed portion 71 thereof. Suitable means, either manual of power-operated, are engaged with shaft 90 to actuate the same from the solid line position shown in FIG. 2 toward the right to position sliding gear 70 in the "NEUTRAL" position indicated by dashed line 82 and to the "ROAD" position indicated by dashed line 80. The shaft 90 is moved back and forth between these positions with a detent mechanism, indicated at 96, being provided to frictionally secure the shaft 90 in the "PUMP" position and the "ROAD" position.

Shaft portion 40 of input member 30 is provided with an externally threaded portion 98 which is located between the flange portion 38 and splined portion 48. Threaded portion 98 is adapted to be engaged by a speed counter drive 100 for a speed indicating mechanism of a type conventional in the art.

Figure 3:
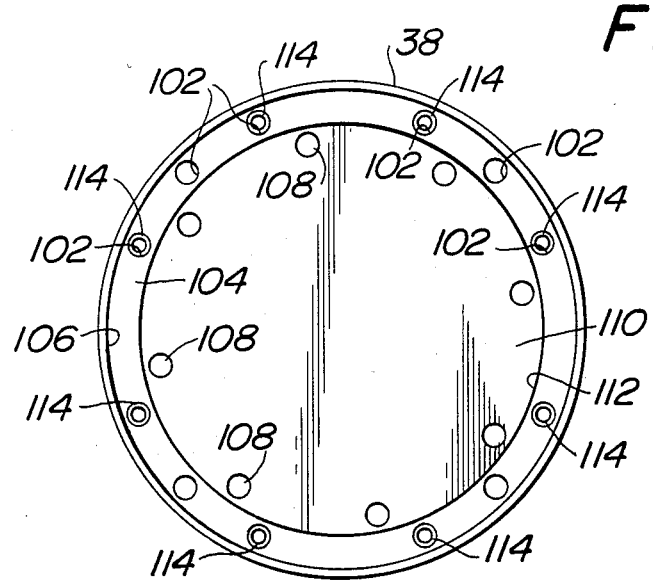
FIG. 3 is an end view of an input flange in accordance with the invention.

Input flange 38 is provided with a bolt hole pattern such that it can be attached to a plurality of different drive shaft universal joint flanges from various types of engine transmissions. The bolt hole pattern is shown in FIG. 3 and comprises a first group of bolt holes 102 arranged in four groups of three holes circumferentially spaced in an annular pilot surface 104 inwardly of a first pilot rim 106 thereby providing twelve bolt holes 102. A second group of eight bolt holes 108 are provided in a second pilot surface 110 internally of pilot surface 104 and bounded by a pilot rim 112. There are provided eight circumferentially equally spaced bolt holes 108. In addition, tubular inserts 114 are pressed into eight of the holes 102 at circumferentially equally spaced locations as is shown in FIG. 3.

By the arrangement shown in FIG. 3, a first transmission means can be attached to flange 38 by bolts which cooperate with the eight equally spaced holes 108 in pilot surface 110. A second transmission means can be attached to input flange 38 by bolts which cooperate with the holes provided by the eight equally spaced tubular inserts 114 in the holes 102 in pilot surface 104. By removing inserts 114, with a punch or the like, a third transmission means can be attached to input flange 38 by bolts which cooperate with the twelve holes 102 in pilot surface 104.

The output flange 50 is constructed in the same manner as the input flange 38 with a bolt hole pattern and tubular inserts as described above with reference to FIG. 3.

It will be apparent that various changes may be made in the construction and arrangement of parts without departing from the scope of the invention as defined by the following claims.

What is claimed is:

1. A pump transmission for a pump having a pump shaft and an input gear for causing rotation of said pump shaft comprising:
   a housing mounted adjacent the pump input gear having first and second spaced apart wall means, an input member rotatably mounted in said housing and including a splined shaft portion, a cylindrical shaft portion and an input flange portion, first rolling bearing means positioned between said first housing wall means and said input member cylindrical shaft portion for rotatably supporting said input member in said housing, an output member rotatably mounted in said housing in axial alignment with said input member and including a splined shaft portion, a cylindrical shaft portion and an output flange portion, second rolling bearing means positioned between said second housing wall means and said output member cylindrical shaft portion for rotatably supporting said output member in said housing, said splined portions of said input member and said output member being axially aligned and having the same tooth configuration, said input member and said output member being rotatably mounted to rotate on an axis spaced from and adjacent to the axis of rotation of the pump input gear, a sliding gear slidably mounted on said splined shaft portion of said input member at an internal splined portion thereof and having externally facing gear teeth, said sliding gear being constructed and arranged to cooperate with said splined shaft portions of said input member and output member to slide between a road position wherein said internal splined portion thereof is in engagement with both the splined shaft portions of said input member and said output member and a pump position wherein said internal splined portion thereof only engages the splined shaft portion of the input member, the gear teeth of said sliding gear engaging the gear teeth of the pump input gear in said pump position of said sliding gear, said input flange being provided with an annular pilot surface having a plurality of circumferentially spaced holes therein for use in attaching the input flange to a first transmission means and a second pilot surface internally of said first pilot surface and having a second series of holes formed therein for use in attaching said input flange to a second transmission means.

2. A pump transmission for a pump having a pump shaft and an input gear for causing rotation of said pump shaft comprising:

a housing mounted adjacent the pump input gear having first and second spaced apart wall means, an input member rotatably mounted in said housing and including a splined shaft portion, a cylindrical shaft portion and an input flange portion, first rolling bearing means positioned between said first housing wall means and said input member cylindrical shaft portion for rotatably supporting said input member in said housing, an output member rotatably mounted in said housing in axial alignment with said input member and including a splined shaft portion, a cylindrical shaft portion and an output flange portion, second rolling bearing means positioned between said second housing wall means and said output member cylindrical shaft portion for rotatably supporting said output member in said housing, said splined portions of said input member and said output member being axially aligned and having the same tooth configuration, said input member and said output member being rotatably mounted to rotate on an axis spaced from and adjacent to the axis of rotation of the pump input gear, a sliding gear slidably mounted on said splined shaft portion of said input member at an internal splined portion thereof and having externally facing gear teeth, said sliding gear being constructed and arranged to cooperate with said splined shaft portions of said input member and output member to slide between a road position wherein said internal splined portion thereof is in engagement with both the splined shaft portions of said input member and said output member and a pump position wherein said internal splined portion thereof only engages the splined shaft portion of the input member, the gear teeth of said sliding gear engaging the gear teeth of the pump input gear in said pump position of said sliding gear, said input flange being provided with a first annular pilot surface having a first series of circumferentially spaced bolt holes therein and arranged to provide a first bolt hole circle of a first diameter for use in attaching said input flange to a first transmission flange means, and a second annular pilot surface internally of said first pilot surface and having a second series of circumferentially spaced bolt holes formed therein and arranged to provide a second bolt hole circle of a second diameter for use in attaching said input flange to a second transmission flange means, said first diameter of said first bolt hole circle being larger than said second diameter of said second bolt hole circle whereby said input flange can be attached to two different size transmission flange means.

3. A pump transmission for a pump having a pump shaft and an input gear for causing rotation of said pump shaft comprising:

a housing mounted adjacent the pump input gear having first and second spaced apart wall means, an input member rotatably mounted in said housing and including a splined shaft portion, a cylindrical shaft portion and an input flange portion, first rolling bearing means positioned between said first housing wall means and said input member cylindrical shaft portion for rotatably supporting said input member in said housing, an output member rotatably mounted in said housing in axial alignment with said input member and including a splined shaft portion, a cylindrical shaft portion and an output flange portion, second rolling bearing means positioned between said second housing wall means and said output member cylindrical shaft portion for rotatably supporting said output member in said housing, said splined portions of said input member and said output member being axially aligned and having the same tooth configuration, said input member and said output member being rotatably mounted to rotate on an axis spaced from and adjacent to the axis of rotation of the pump input gear, a sliding gear slidably mounted on said splined shaft portion of said input member at an internal splined portion thereof and having externally facing gear teeth, said sliding gear being constructed and arranged to cooperate with said splined shaft portions of said input member and output member to slide between a road position wherein said internal splined portion thereof is in engagement with both the splined shaft portions of said input member and said output member and a pump position wherein said internal splined portion thereof only engages the splined shaft portion of the input member, the gear teeth of said sliding gear engaging the gear teeth of the pump input gear in said pump position of said sliding gear, said second housing wall means extending for a substantial axial extent along said cylindrical shaft portion of said output member, said second rolling bearing means comprising a pair of roller bearings mounted in spaced apart relation in said second housing wall means for bearing contact with said cylindrical shaft portion of said output member at axial spaced locations thereon to provide bearing support of said output member against axial pivoting movement thereof in response to angular external loads thereon, said input member and said output member being provided with cooperating overlapping end portions and including a third bearing means between said end portions to provide bearing engagement between said input member and said output member at said overlapping end portions.

said end portion of said output member comprising a cylindrical bore extending axially inwardly from the end thereof and said end portion of said input member comprising a cylindrical extension portion received in said cylindrical bore of said output member with said third bearing means therebetween, at least a portion of said third bearing means and said overlapping end portions being aligned radially with one of said roller bearings of said second rolling bearing means and with said second housing wall means whereby said third bearing means is supported by said second bearing means and said second housing wall means.

4. A pump transmission according to claim 1 wherein some of the holes in said first pilot surface are provided with tubular inserts adapted to be removed therefrom to permit the input flange to be attached to a third transmission means.

5. A pump transmission according to claim 1 wherein said output flange is provided with an annular pilot surface having a plurality of circumferentially spaced holes therein for use in attaching the output flange to a first driven member and a second pilot surface internally of said first pilot surface and having a second series of holes on therein for use in attaching said output flange to a second driven means.

6. A pump transmission according to claim 5 wherein some of the holes in said first pilot surface of said output flange are provided with tubular inserts adapted to be removed therefrom to permit the output flange to be attached to a third driven means.

7. A pump transmission according to claim 2 wherein some of the holes in said first pilot surface are provided with tubular inserts adapted to be removed therefrom to permit the input flange to be attached to a third transmission flange means.

8. A pump transmission according to claim 3, wherein said overlapping end portions and said third bearing means are axially spaced from the pump input gear.

9. A pump transmission according to claim 3 including actuating means mounted in said housing for actuating said sliding gear between said road position and said pump position thereof.

10. A pump transmission according to claim 3 wherein said cylindrical shaft portion of said input member is provided with a threaded portion located between said flange portion and said splined shaft portion thereof for use in actuating a speed indicating mechanism, said input and output members each being made of a one-piece construction with integral splined shaft, cylindrical shaft and flange portions.

11. A pump transmission according to claim 3 wherein said input member and said output member are each integral high strength forgings.

12. A pump transmission according to claim 3 wherein said splined shaft portions of said input and output members and said internal splined portion of said sliding gear have an involute configuration, said input and output members each being made of a high strength one-piece forging with integral splined shaft, cylindrical shaft and flange portions.

* * * * *